US009892397B2

(12) United States Patent
Suzuki

(10) Patent No.: US 9,892,397 B2
(45) Date of Patent: Feb. 13, 2018

(54) COMMODITY SALES DATA PROCESSING APPARATUS AND METHOD FOR CONTROLLING EXECUTABLE JOB BY THE SAME

(71) Applicant: TOSHIBA TEC KABUSHIKI KAISHA, Shinagawa-ku, Tokyo (JP)

(72) Inventor: Hiromasa Suzuki, Numazu (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 586 days.

(21) Appl. No.: 14/340,808

(22) Filed: Jul. 25, 2014

(65) Prior Publication Data

US 2015/0032557 A1  Jan. 29, 2015

(30) Foreign Application Priority Data

Jul. 25, 2013 (JP) .................................. 2013-154406

(51) Int. Cl.
*G06Q 20/00* (2012.01)
*G06Q 20/20* (2012.01)
(Continued)

(52) U.S. Cl.
CPC ....... *G06Q 20/206* (2013.01); *G06F 13/4081* (2013.01); *G06Q 20/202* (2013.01);
(Continued)

(58) Field of Classification Search
None
See application file for complete search history.

(56) References Cited

U.S. PATENT DOCUMENTS 5,587,560 A * 12/1996 Crooks ................. G06F 3/0488
178/18.03
5,933,812 A * 8/1999 Meyer .................... G06Q 20/20
235/380

(Continued)

FOREIGN PATENT DOCUMENTS

JP          11-86135        3/1999
JP        2002-183834       6/2002
(Continued)

OTHER PUBLICATIONS

First Office Action for Japanese Patent Application No. 2013-154406 dated Apr. 14, 2015, 7 pages.

*Primary Examiner* — Fateh M Obaid
(74) *Attorney, Agent, or Firm* — Amin, Turocy & Watson LLP

(57) ABSTRACT

A commodity sales data processing apparatus, including a portable information terminal having a battery and a display on which an executable job name is displayed and a docking station on which the information terminal is mounted to charge the battery, monitors whether or not the information terminal is mounted on the docking station to detect the separation therebetween. The processing apparatus restricts jobs permitted at the time the information terminal is separated from the docking station to a part of jobs permitted at the time the information terminal is mounted on the docking station if the separation between the information terminal and the docking station is detected and the display of the information terminal displays job names permitted at the time the information terminal is separated from the docking station if the separation between the information terminal and the docking station is detected.

7 Claims, 7 Drawing Sheets

(51) Int. Cl.
  *G06F 13/40* (2006.01)
  *G07G 1/00* (2006.01)
  *G07G 1/14* (2006.01)
(52) U.S. Cl.
  CPC ......... *G07G 1/0009* (2013.01); *G07G 1/0018* (2013.01); *G07G 1/14* (2013.01)

(56) References Cited

U.S. PATENT DOCUMENTS

| | | | | |
|---|---|---|---|---|
| 6,522,347 | B1* | 2/2003 | Tsuji | G06Q 30/02 345/419 |
| 9,052,965 | B2* | 6/2015 | Santhiveeran | G06F 9/4856 |
| 2002/0157001 | A1* | 10/2002 | Huang | G06F 9/441 713/2 |
| 2002/0194129 | A1* | 12/2002 | Furuya | G06Q 20/20 705/41 |
| 2004/0173674 | A1* | 9/2004 | Matsuura | G06Q 20/04 235/380 |
| 2006/0181730 | A1* | 8/2006 | Moore | G06F 3/1209 358/1.15 |
| 2007/0239556 | A1* | 10/2007 | Wagner | G06Q 20/204 705/17 |
| 2008/0162347 | A1* | 7/2008 | Wagner | G06Q 20/10 705/44 |
| 2009/0163139 | A1* | 6/2009 | Wright-Riley | G06F 1/1632 455/39 |
| 2014/0222598 | A1* | 8/2014 | Konishi | G06Q 20/18 705/21 |

FOREIGN PATENT DOCUMENTS

| | | |
|---|---|---|
| JP | 2009-009322 | 1/2009 |
| JP | 2012-252605 | 12/2012 |

\* cited by examiner

| JOB ID | JOB NAME | LIMITATION FLAG |
|---|---|---|
| 1000 | SALES REGISTRATION | 0 |
| 2000 | COMMODITY RETURN REGISTRATION | 0 |
| 3000 | INSPECTION | 1 |
| 4000 | SETTLEMENT | 1 |
| ⋮ | ⋮ | ⋮ |

COMMODITY SALES DATA PROCESSING APPARATUS AND METHOD FOR CONTROLLING EXECUTABLE JOB BY THE SAME

CROSS-REFERENCE TO RELATED APPLICATION

This application is based upon and claims the benefit of priority from Japanese Patent Application No. 2013-154406, filed Jul. 25, 2013, the entire contents of which are incorporated herein by reference.

FIELD

Embodiments described herein relate to a commodity sales data processing apparatus including a portable information terminal and a docking station and a method for controlling a job executable by the portable information terminal.

BACKGROUND

A POS (Point Of Sales) terminal well-known as a commodity sales data processing apparatus is generally of a stationary type and is formed by mounting input/output devices, such as a keyboard, a display, a printer and the like, on a main body carrying a control unit.

In recent years, a portable information terminal carrying a touch panel, namely a tablet-type information terminal, has been popularized. If a POS terminal is formed with such an information terminal, for example, the sales data of a commodity purchased by a customer can be registered while service for customers is offered at the sales floor. This is very convenient for both customer and shop clerk. However, it is not preferable to execute, except a registration function within functions of the POS terminal, an inspection function, a settlement function and a journal retrieval function with such a portable information terminal which can be used at any location on the sales floor in view of an information security because confidential information of a store is required at the time such functions are executed.

BRIEF DESCRIPTION OF THE DRAWINGS

FIG. 5 is a schematic view illustrating the data constitution of a job control table;

DETAILED DESCRIPTION

In accordance with one embodiment, a commodity sales data processing apparatus comprising a portable information terminal carrying a battery as a driving power supply and a docking station with which the portable information terminal is detachably connected, includes a monitoring module and a limiting module. The portable information terminal includes an input section for receiving input of the data relating to the sales processing of a commodity, a processing section for processing commodity sales data based on the input data, and a display section for displaying job names executable by the portable information terminal and the processing result of the processing section. The docking station charges the battery of the portable information terminal if the portable information terminal is physically connected with the docking station. The monitoring module monitors whether or not the portable information terminal is connected with the docking station to detect a disconnection state of the portable information terminal and the docking station. The limiting module restricts jobs permitted at the time the portable information terminal is disconnected with the docking station to a part of jobs permitted at the time the portable information terminal is connected with the docking station if the disconnection state between the portable information terminal and the docking station is detected through the monitoring module, wherein the display section displays job names permitted at the time the portable information terminal is disconnected with the docking station if the portable information is disconnected with the docking station.

An embodiment of the commodity sales data processing apparatus is described below with reference to the accompanying drawings. Further, a commodity sales data processing apparatus 1 which realizes functions of a POS terminal with a tablet type portable information terminal is exemplified in the present embodiment.

Figure 1:
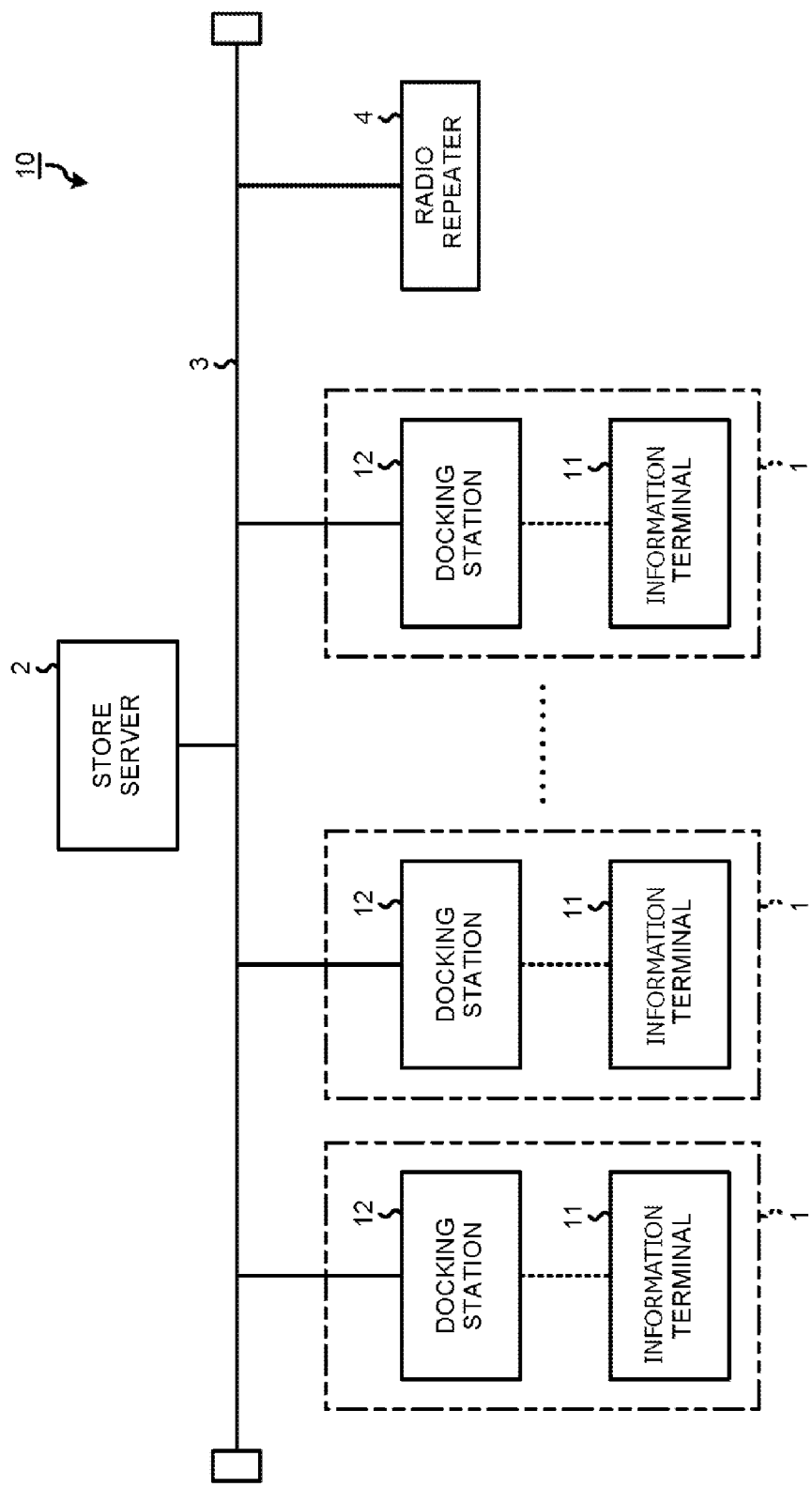
FIG. 1 is a schematic configuration diagram illustrating a POS system using a commodity sales data processing apparatus according to an embodiment.

FIG. 1 is a schematic configuration diagram illustrating a POS system 10 using the commodity sales data processing apparatus 1. The POS system 10 comprises a plurality of commodity sales data processing apparatuses 1 and a store server 2 for unitarily managing each commodity sales data processing apparatus 1. Each commodity sales data processing apparatus 1 is connected with the store server 2 to carry out the bidirectional communication with the store server 2 via a network 3 such as a LAN (Local Area Network) and the like. Further, at least one radio repeater 4 is connected with the network 3.

Each commodity sales data processing apparatus 1 consists of a tablet type portable information terminal (hereinafter referred to as an information terminal) 11 and a docking station 12. The information terminal 11 is mounted on or separated from the docking station 12, and realizes functions of a POS terminal in not only a physically connected or mounted state with the docking station 12 but also a physically disconnected or separated state. However, functions that can be achieved by the information terminal 11 in the separated state are restricted in comparison with that in the mounted state. In the present embodiment, connection refers to a state in which the information terminal 11 is mounted on the docking station 12 and disconnection refers to a state in which the information terminal 11 is separated from the docking station 12. The information terminal 11 and the docking station 12 may be able to carry out communication therebetween, for example, in a wireless manner, in the two states described above. The information terminal 11 and the docking station 12 may also be able to carry out communication therebetween only in the connected state described above.

Figure 2:
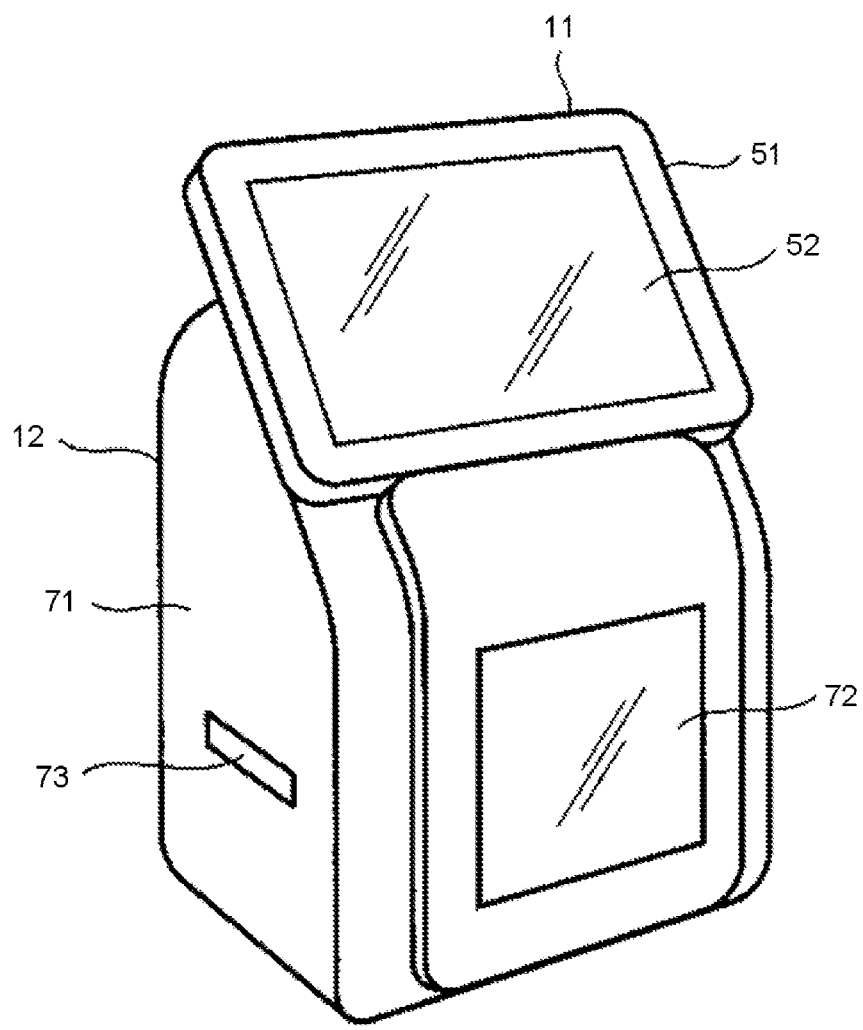
FIG. 2 is an external perspective view illustrating a commodity sales data processing apparatus in which a information terminal is connected with a docking station.
Figure 3:
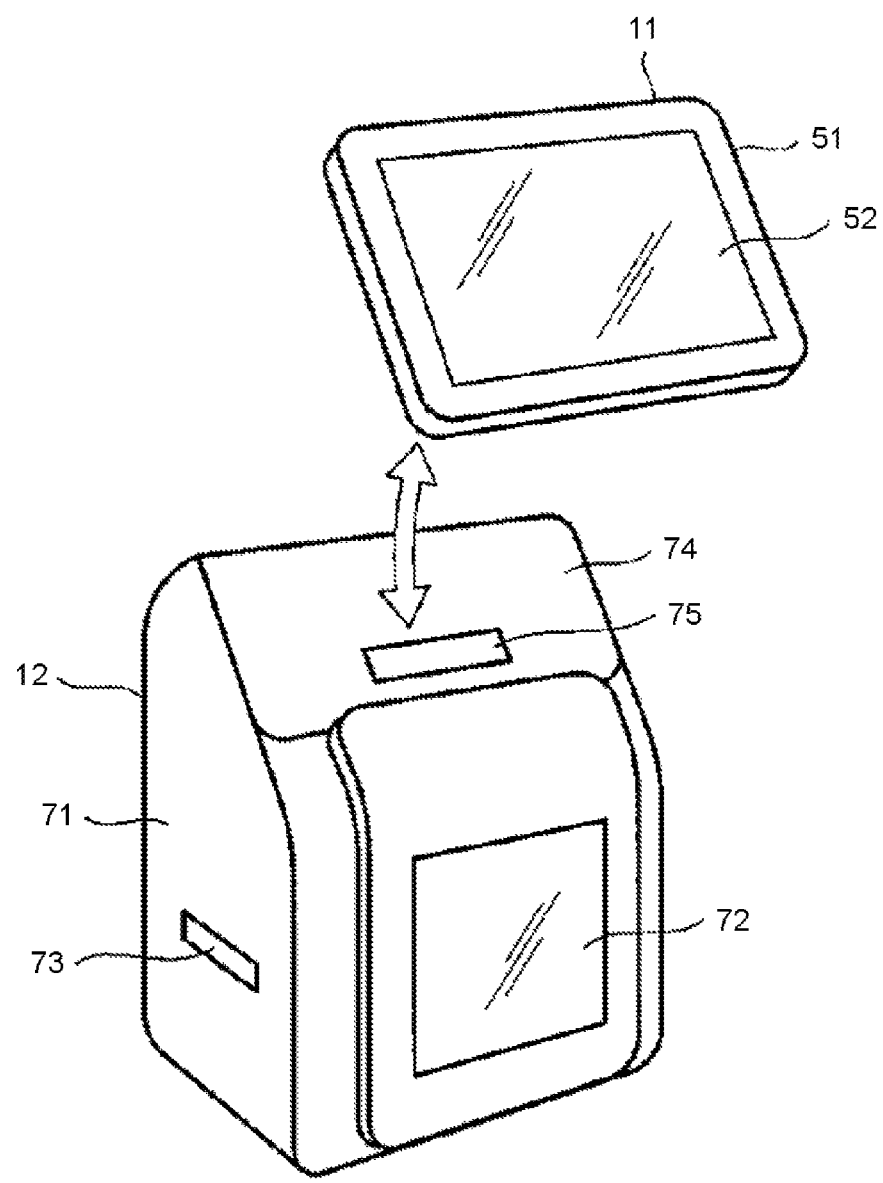
FIG. 3 is an external perspective view illustrating a commodity sales data processing apparatus in which a information terminal is separated from a docking station.

FIG. 2 and FIG. 3 are external perspective views illustrating the commodity sales data processing apparatus 1.

Figure 4:
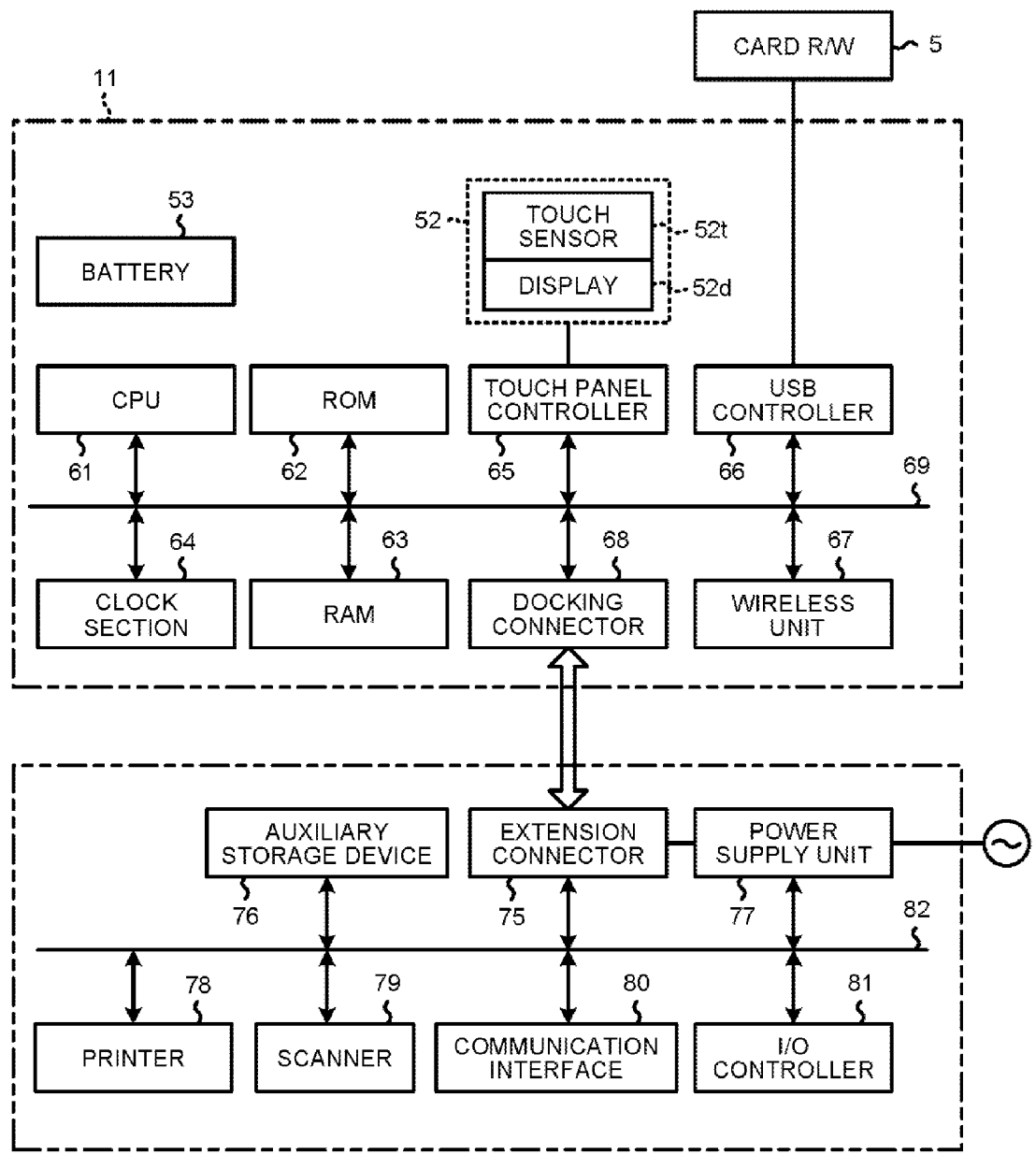
FIG. 4 is a block diagram illustrating a constitution of main portion of a commodity sales data processing apparatus.

FIG. 2 shows a first state (mounted state) in which the information terminal 11 is connected with the docking station 12, and FIG. 3 shows a second state (separated state) in which the information terminal 11 is disconnected from the docking station 12. Further, FIG. 4 is a block diagram illustrating a constitution of main portion of the commodity sales data processing apparatus 1. The specific constitution of the information terminal 11 and the docking station 12 is described below with reference to FIG. 2-FIG. 4.

The information terminal 11 has a plate-shaped casing 51 formed in a portable size. The information terminal 11 includes a touch panel 52 arranged at one of the surfaces (referred to as a front surface) of the casing 51. Further, the information terminal 11 carries a battery 53 as a driving power supply. The information terminal 11 comprises a CPU (Central Processing Unit) 61, a ROM (Read Only Memory) 62, a RAM (Random-access Memory) 63, a clock section 64, a touch panel controller 65, a USB (Universal Serial Bus) connector 66, a wireless unit 67 and a docking connector 68. The CPU 61 is connected with the ROM 62, the RAM 63, the clock section 64, the touch panel controller 65, the USB connector 66, the wireless unit 67 and the docking connector 68 via a bus line 69 including an address bus, a data bus and the like.

The CPU 61 which is the central part of a computer controls each section to realize various functions of a POS terminal according to an operating system and an application program.

The ROM 62 which is the main storage part of the computer stores the operating system and application programs. As occasion demands, the ROM 62 also stores data used by the CPU 61 at the time the CPU 61 executes various processing.

The RAM 63 which is also the main storage part of the computer stores data used by the CPU 61 if needed at the time the CPU 61 executes various processing. Further, the RAM 63 may provide a work area for the CPU 61 at the time the CPU 61 carries out various processing.

The clock section 64 keeps the current date and time. The touch panel 52 is constituted with a display 52d serving as a display section and a touch sensor 52t serving as an input section arranged on the display portion (screen) of the display 52d. The touch panel controller 65 connected with the touch panel 52 controls the display on the screen of the display 52d while monitoring the signal from the touch sensor 52t. The touch panel controller 65 detects input data according to the coordinate information of the touched position on the screen and the screen information of the display 52d at the time of the touch operation.

The USB connector 66 is used for detachably connecting various USB devices having a communication system conforming to the USB standard. In the present embodiment, a card reader/writer 5, capable for a USE connection, which reads or writes data from or into an electronic money card, is connected with the USB connector 66.

The wireless unit 67 carries out data transmission/reception with the radio repeater 4 through the wireless communication.

The docking connector 68 is used for connecting the information terminal 11 with the docking station 12. The docking connector 68 is arranged on a side (referred to as a back side surface) opposite to the surface of the casing 51 on which the touch panel 52 is arranged.

The docking station 12 has a stationary box-shaped casing 71. A reading window 72 for a scanner is arranged at a front side of the casing 71, and a receipt issuing opening 73 is formed at a left side of the cashing 71. The upper side surface of the casing 71 is inclined towards the front side thereof to form a mounting surface 74 for receiving the information terminal 11. An extension connector 75 is arranged on the mounting surface 74 of the casing 71. The extension connector 75 is connected with the docking connector 68 arranged at the back side of the information terminal 11 at the time the information terminal 11 is mounted on the mounting surface 74 of the casing 71. Thus, the information terminal 11 is electrically connected with the docking station 12.

In addition to the extension connector 75, as shown in FIG. 4, the docking station 12 is equipped with at least an auxiliary storage device 76, a power supply unit 77, a printer 78, a scanner 79, a communication interface 80 and an I/O controller 81. The extension connector 75 is connected with the auxiliary storage device 76, the printer 78, the scanner 79, the communication interface 80 and the I/O controller 81 via a bus line 82 including an address bus, a data bus and the like.

The auxiliary storage device 76 serves as the auxiliary storage part of a computer. The auxiliary storage device 76 is, for example, an EEPROM (Electric Erasable Programmable Read-only Memory), an HDD (Hard Disk Drive) or an SSD (solid state drive), and the like. The auxiliary storage device 76 stores data used in various processing carried out by the CPU 61 of the information terminal 11 and data generated in the processing by the CPU 61. As occasion demands, the auxiliary storage device 76 stores application programs.

In the present embodiment, the identification information DSNo. K (K=1, 2, 3 . . .), which is assigned in advance to identify the corresponding docking station 12, is stored in the auxiliary storage device 76 of each docking station 12.

The power supply unit 77 supplies a driving power to input/output devices such as the auxiliary storage device 76, the printer 78, the scanner 79 and the like. Further, the power supply unit 77 supplies power for charging the battery 53 of the information terminal 11 via the extension connector 75.

The printer 78 prints on a sheet fed from the rolled paper, for example, in a thermal print system. The printed sheet of the rolled paper is discharged from the receipt issuing opening 73, and is cut off to be issued as a receipt. The printer 78 is also capable of issuing a label by using a label sheet as the rolled paper. Further, the printer 78 may print a sheet in another print system other than the thermal print system.

The scanner 79 optically reads, for example, a barcode held to the reading window 72. The scanner 79 may read the barcode attached to a commodity from the image of the commodity captured by a camera.

The communication interface 80 is connected with the network 3. The communication interface 80 performs the data transmission/reception between the tablet information 11 and the store server 2 via the communication network 3.

The I/O controller 81 is connected with an external machine such as a drawer (not shown) to control the open/close operations thereof.

The commodity sales data processing apparatus 1 consisting of the information terminal 11 and the docking station 12 having the aforementioned constitutions includes a job control table 90 having the data constitution shown in FIG. 5. The job control table 90 stores a job ID, a job name and a limitation flag for each job ID. The job ID is a code for identifying each job that can be executed by the commodity sales data processing apparatus 1. The job name indicates a job specified by the corresponding job ID. The limitation flag provides restriction information for identifying whether or not execution of a job specified by the corresponding job ID is inhibited in a state in which the information terminal 11 is separated from the docking station 12 (hereinafter referred to as a disconnection state). In the present embodiment, the limitation flag is "1" if the job is inhibited or "0" if the job is permitted.

In the example shown in FIG. 5, the job specified with the job name 'sales registration' identified by a job ID "1000" and the job specified with the job name 'returned commodity registration' identified by a job ID "2000" are not inhibited even if the information terminal 11 is separated from the docking station 12 (disconnection state). However, the job specified with the job name 'inspection' identified by a job ID "3000" and the job specified with the job name 'settlement' identified by a job ID "4000" are inhibited in the disconnection state.

The job specified with the job name 'sales registration' is a registration processing in which the sales data of a commodity input through the touch panel 52 is registered in a memory. The job specified with the job name 'returned commodity registration' is a returned commodity processing in which the sales data of a commodity registered is deleted from the memory. The job specified with the job name 'inspection' is a processing in which the commodity sales data registered in the memory are added up according to items such as 'commodity', 'time zone' and 'cashier' to output them as a report. Further, the job specified with the job name 'settlement' is a processing in which the memory in which the commodity sales data are registered is cleared after a report similar to that of the inspection is output.

The job control table 90 functions as a setting module which sets information (limitation flag) therein for identifying whether or not each job which is permitted in the connection state in which the information terminal 11 is mounted on the docking station 12 is inhibited in the disconnection state in which the information terminal 11 is separated from the docking station 12.

The job control table 90 is created in the store server 2 and is distributed to each commodity sales data processing apparatus 1 from the store server 2 via the network 3 to be stored in the auxiliary storage device 76 of each docking station 12.

Figure 6:
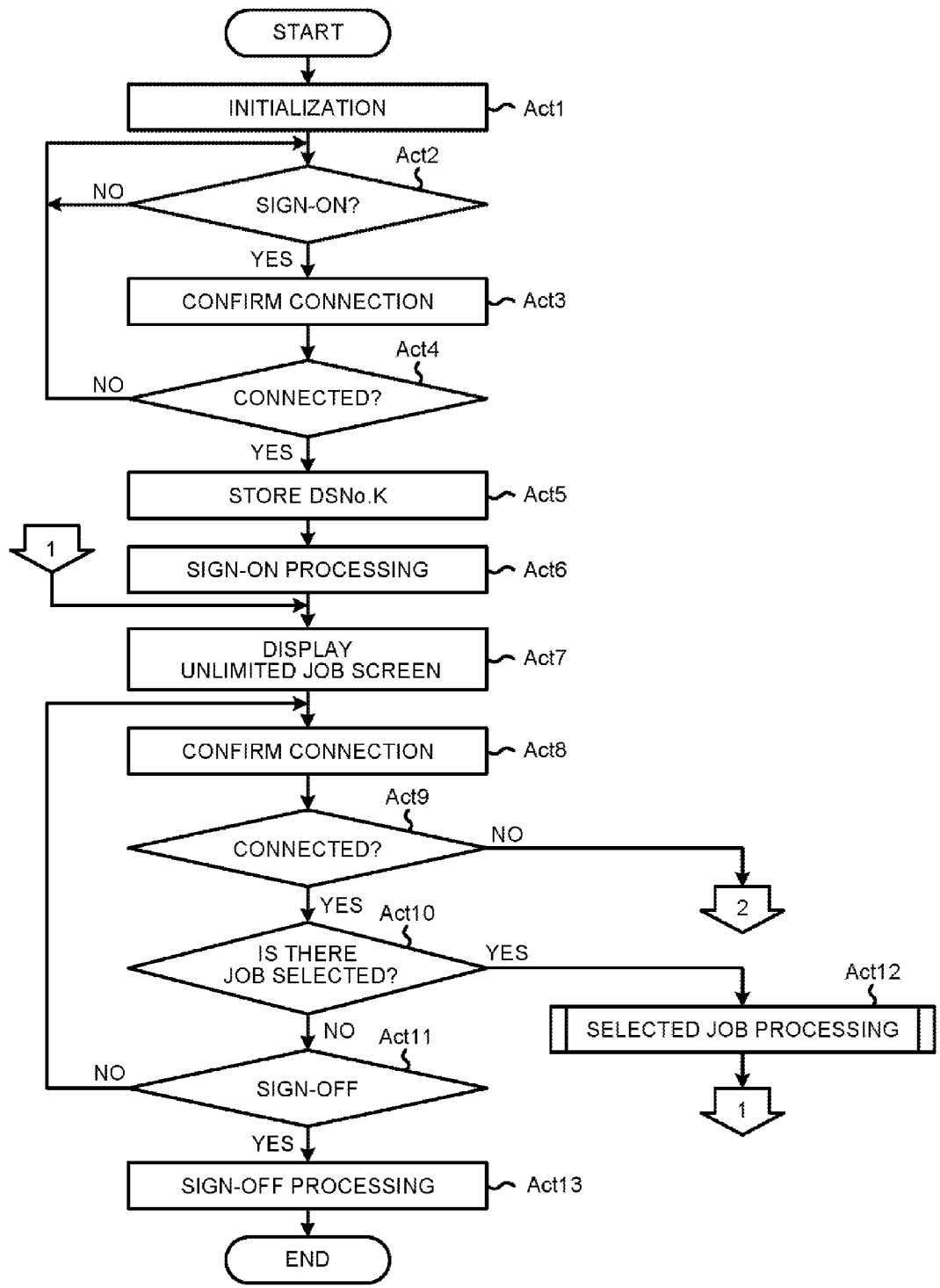
FIG. 6 is a flowchart illustrating a procedure of the main information processing executed by the CPU of a commodity sales data processing apparatus.
Figure 7:
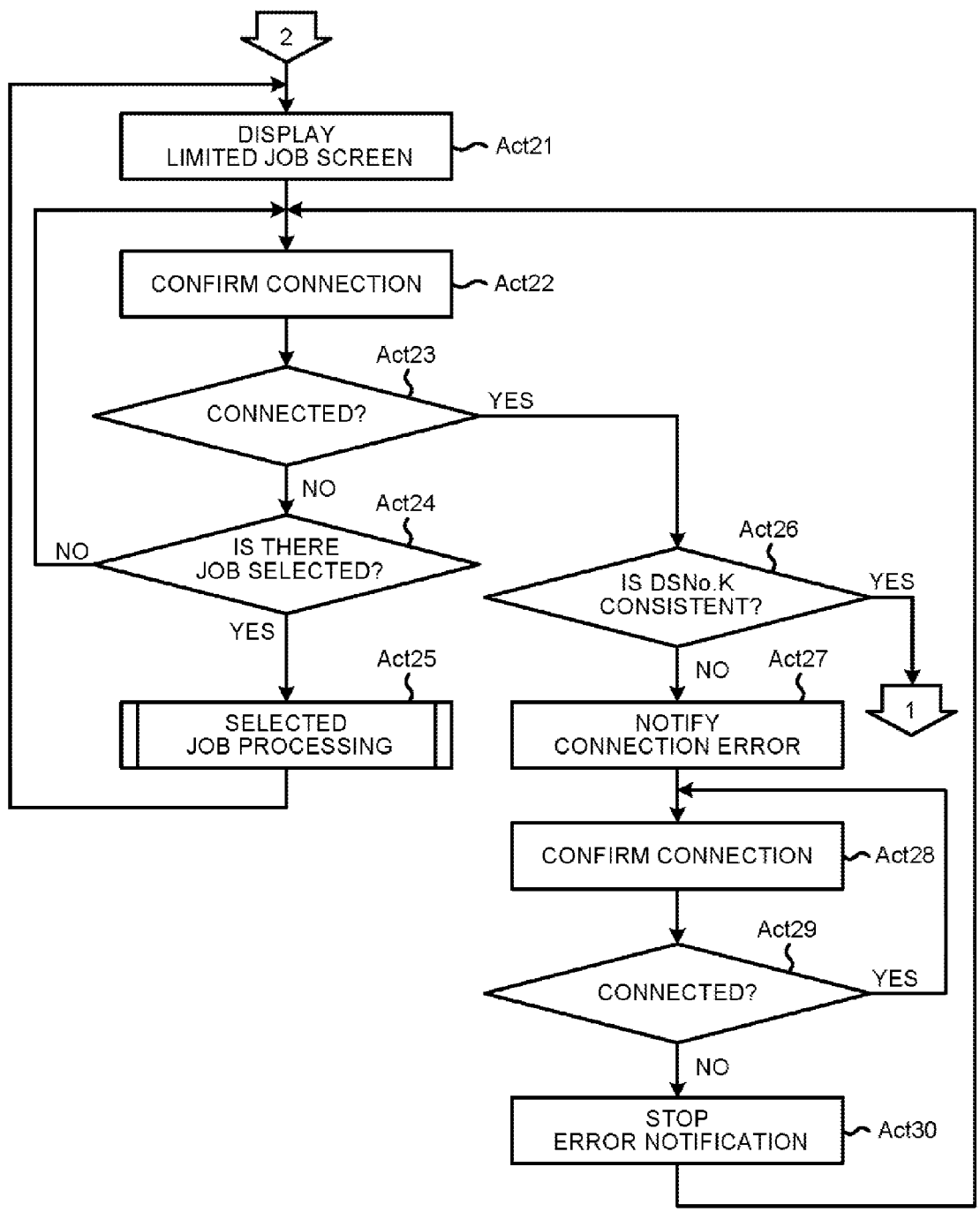
FIG. 7 is a flowchart illustrating a procedure of the main information processing executed by the CPU of a commodity sales data processing apparatus.

FIG. 6 and FIG. 7 are flowcharts illustrating the main procedures of an information processing carried out by the CPU 61 serving as the processing section of the commodity sales data processing apparatus 1. The procedures are based on the control program stored in the ROM 62. Further, the content of the processing shown in the flowcharts and described below is merely described by way of example, and a variety of other processing capable of achieving the same result is also applicable.

For example, if a control program is started by switching on a power switch (not shown) arranged on the information terminal 11, the CPU 61 starts the processing according to the procedure shown in the flowcharts. First, the CPU 61 carries out an initialization processing (ACT 1). The RAM 63 is cleared through the initialization processing. Further, an initial screen is displayed on the display 52d of the touch panel 52. An image for receiving a sign-on input for specifying the user (shop clerk, cashier and the like) of the information terminal 11 is displayed on the initial screen.

The CPU 61 receives the sign-on input (ACT 2). Upon receiving the sign-on input according to the image information displayed on the display 12d and the coordinate information of a touched position detected by the touch sensor 12t (YES in ACT 2), the CPU 61 confirms whether or not the information terminal 11 is connected with or mounted on the docking station 12 (ACT 3, ACT 4: monitoring module)

Specifically, the CPU 61 outputs a confirmation signal via the docking connector 68. The confirmation signal is returned to the docking connector 68 via the extension connector 75 in the connection state but not returned to the docking connector 68, otherwise. Therefore, it is determined that the information terminal 11 is connected with the docking station 12 if the confirmation signal is returned to the docking connector 68 via the extension connector 75 but it is determined that the information terminal 11 is disconnected with the docking station 12 if the confirmation signal is not returned.

The constitution for confirming whether or not the information terminal 11 is connected with the docking station 12 is not limited to this. For example, it is determined that the information terminal 11 is connected with the docking station 12 if the CPU 61 can successfully read an optional data stored in the auxiliary storage device 76 of the docking station 12 through the docking connector 68 or that the information terminal 11 is disconnected with the docking station 12 if the CPU 61 cannot read the optional data stored in the auxiliary storage device 76. Alternatively, the docking connector 68 is provided with a sensor, for example, which is activated to output a signal if the docking connector 68 is connected with the extension connector 75. Then, it may determine whether or not the information terminal 11 is connected with the docking station 12 according to the signal from the sensor.

The CPU 61 invalidates the sign-on input (control module) if it is determined that the information terminal 11 is disconnected with the docking station 12 (NO in ACT 4). Then, the CPU 61 returns to ACT 2 to receive the sign-on input again.

On the other hand, CPU 61 validates the sign-on input (control module) if it is determined that the information terminal 11 is connected with the docking station 12 (YES in ACT 4). Then, the CPU 61 reads the identification information DSNo.K of the docking station 12 from the auxiliary storage device 76 of the docking station 12 which is in the connection state with the information terminal 11 and stores the read identification information DSNo.K in a specific area of the RAM 63 (ACT 5: storage module)

Sequentially, the CPU 61 carries out the sign-on processing (ACT 6). The processing includes the following processing: reading data in the job control table 90 from the auxiliary storage device 76 and storing the read data in the specific area of the RAM 63.

When the sign-on processing is ended, the CPU 61 creates an unlimited job screen based on the data of the job control table 90 stored in the RAM 63 and displays it on the display 12d (ACT 7). On the unlimited job screen, a plurality of button images are displayed, for example, in a matrix form and the job names set in the job control table 90 are displayed on the button images respectively. Further, an image for receiving a sign-off input for instructing the release of the user of the information terminal 11 is also displayed on the unlimited job screen. A button image on which no job name is displayed is not displayed on the unlimited job screen. Thus, the number of the button images is the same as that of the job IDs (job names) set in the job control table 90.

The CPU 61 confirms again in a state in which the unlimited job screen is displayed whether or not the information terminal 11 is connected with the docking station 12 (Act 8, Act 9: monitoring module). If it is confirmed again that the information terminal 11 is connected with the docking station 12 (YES in ACT 9), the CPU 61 enters a standby state until one of the jobs displayed on the unlimited job screen is selected (ACT 10) or a sign-off input is received (ACT 11).

If one of the button images on the unlimited job screen is touched, the CPU 61 determines that the job specified with the job name displayed on the button image is selected (YES in ACT 10). Then, the CPU 61 starts the processing of the selected job (ACT 12). For example, if the button image on which a job name 'sales registration' is displayed is touched, the processing of the job specified with the job name 'sales registration' is started. Similarly, if the button image on which a job name 'inspection' is displayed is touched, the processing of the job specified with the job name 'inspection' is started. These job processing are similar to those carried out in a well-known commodity sales data processing apparatus such as a POS terminal and are not therefore described.

The CPU 61 returns to ACT 7 if the selected job processing is ended. The CPU 61 changes the screen of the display 12*d* back to the unlimited job screen.

If it is confirmed in the state in which the unlimited job screen is displayed that the information terminal 11 is disconnected from the docking station 12 (NO in ACT 9), the CPU 61 creates a limited job screen based on the data of the job control table 90 and displays the created limited job screen on the display 12*d* (ACT 21: limiting module). On the limited job screen, a plurality of button images are displayed, for example, in a matrix form and job names of which the corresponding limitation flags are "0" in the job control table 90 are respectively displayed on the button images. A button image on which no job name is displayed is not displayed on the limited job screen. Thus, the number of the button images is the same as that of the job IDs (job names) of which the corresponding limitation flag is "0" in the job control table 90.

If the CPU 61 confirms in the state in which the limited job screen is displayed whether or not the information terminal 11 is connected with the docking station 12 (ACT 22, ACT 23: monitoring module). The CPU 61 enters a standby state until one of the jobs displayed on the limited job screen is selected (ACT 24) if it is confirmed that the information terminal 11 is disconnected with the docking station 12 (NO in ACT 23).

If one of the button images on the limited job screen is touched, the CPU 61 determines that the job specified with the job name displayed on the button image is selected (YES in ACT 24). Then, the CPU 61 starts the processing of the selected job (ACT 25). In this case, the processing is also similar to that carried out by a well-known commodity sales data processing apparatus and is not therefore described.

If it is confirmed in the state in which the limited job is displayed that the information terminal 11 is connected with the docking station 12 (YES in ACT 23), the CPU 61 reads the identification information DSNo.K of the docking station 12 from the auxiliary storage device 76 of the connected docking station 12. Then, the CPU 61 determines whether or not the read identification information is identical with the identification information DSNo.K stored in a specific area of the RAM 63 in the processing in ACT 5 (ACT 26).

The CPU 61 displays a message indicating a connection error on the display 52*d* (ACT 27: notification module) if the read identification information is not identical with the identification information DSNo.K stored in the specific area of the RAM 63 (NO in ACT 26). Then, the CPU 61 enters a standby state until the information terminal 11 is disconnected from the docking station 12 (ACT 28, ACT 29). If it is confirmed that the information terminal 11 is disconnected from the docking station 12 (NO in ACT 29), the CPU 61 erases the message indicating the error (ACT 30). Then, the CPU 61 returns to ACT 22.

The CPU 61 returns to ACT 7 if the read identification information is identical with the identification information DSNo.K stored in the specific area of the RAM 63 (YES in ACT 26). The CPU 61 changes the screen of the display 12*d* back to the unlimited job screen.

If the sign-off input is received in the state in which the unlimited job screen is displayed (YES in ACT 11), the CPU 61 executes a sign-off processing (ACT 13). The sign-off processing includes the following processing: transmitting various data stored in the RAM 63 of the information terminal to the auxiliary storage device 76 of the connected docking station 12. The sign-off processing further includes a processing of erasing the screen of the display 12*d*.

The control program is stopped if the sign-off processing is ended. In this way, the CPU 61 ends the processing.

Thus, the commodity sales data processing apparatus according to the present embodiment consists of the information terminal 11 carrying the battery 53 as a driving power supply and the docking station 12 equipped with an extension connector 75. The information terminal 11 is equipped with the docking connector 68 which can be connected with the extension connector 75 and thus the information terminal 11 is detachably connected with the docking station 12 through the connection between the extension connector 75 and the docking connector 68.

The battery 53 is charged as long as the information terminal 11 is mounted on the docking station 12. Further, a user can sign on for the operation as a cashier on the information terminal 11. If a user (e.g. shop clerk) carries out a sign-on input through the touch panel 52, then the sign-on becomes valid. Then, the unlimited job screen is displayed on the touch panel 52 (display 52*d*).

At this time, all jobs, including an inspection job and a settlement job in addition to registration jobs such as a sales registration job and a returned commodity registration job, can be executed through the information terminal 11.

If the user separates the information terminal 11 from the docking station 12, the screen of the touch panel 52 is switched to the limited job screen on which only the jobs of which the limitation flag is "0" in the job control table 90 are displayed and the jobs displayed can be executed. On the other hand, the jobs of which the limitation flag is "1" are not displayed on the limited job screen and thus such jobs cannot be executed. For example, in a state in which the job control table 90 is set as shown in FIG. 5, a sales registration job and a returned commodity registration job can be executed through the information terminal 11. However, an inspection job and a settlement job for which confidential information of the shop is required cannot be executed.

If the user mounts the information terminal 11 on the docking station 12 again, the screen of the touch panel 52 is returned to the unlimited job screen. Thus, as stated above, execution of the inspection job and settlement job which is inhibited as long as the information terminal 11 is disconnected with the docking station 12 can be permitted.

Besides, if the user mounts the information terminal 11 on a docking station other than the docking station 12 which is mounted on the information terminal 11 at the time the user executes the sign-on input through the information terminal 11, an error message is displayed on the touch panel because the identification information (DSNo.K1) read from the docking station on which the information terminal is mounted is not identical with the identification information (DSNo.K2) stored in the specific area of the RAM 63 of the information terminal 11. In this case, the error message is erased if the user separates the information terminal 11 from the incorrect docking station 12. Then, if the user mounts the information terminal 11 again on the correct docking station, the unlimited job screen is displayed on the touch panel 52 of the information terminal 11.

In this way, the commodity sales data processing apparatus comprising the information terminal 11 and the docking station 12 according to the present embodiment can restrict the jobs that can be executed by the information terminal 11 in a state in which the information terminal 11 is separated from the docking station 12 (disconnection state) according to the job control table 90 in which the jobs that are inhibited in the disconnection state can be distinguished from all the jobs that are permitted in the connection state. Thus, an inspection job, a settlement job and a journal retrieval job and the like for which the confidential information of a store is required can be easily inhibited to the information terminal 11 in the disconnection state.

Further, the same jobs as described above can be inhibited in a case also in which the information terminal 11 is connected with the docking station 12 (incorrect station) other than the docking station (correct station) which is connected at the time the user executes the sign-on input.

The present invention is not limited to the aforementioned embodiments.

For example, a sales registration job, a returned commodity registration job, an inspection job and a settlement job are exemplified in the aforementioned embodiment as all the jobs that can be executed by the commodity sales data processing apparatus, however, the jobs that can be executed by the commodity sales data processing apparatus are not limited to those. Similarly, the jobs which are not permitted at the time the information terminal 11 is disconnected with the docking station 12 are not limited to the inspection job and the settlement job.

Further, the job control table 90 is described in the aforementioned embodiment, however, the selection of jobs permitted or inhibited according to the connection or disconnection state between the information terminal and the docking station may be fixedly set with a program, instead of the job control table 90. Thus, the memory size of the auxiliary storage device can be saved.

In the aforementioned embodiment, only the job names of which the limitation flag is "0" in the job control table 90 are respectively displayed on the button images on the limited job screen, however, the present invention is not limited to this. For example, the button images on which all the job names set in the job control table are displayed on the limited job screen as similar to the unlimited job screen but the job limitation can be achieved such that the input operation of the button images on which the job names inhibited in the disconnection state are displayed are disabled, or are not effected even if the input operation of such button images are accepted.

The commodity sales data processing apparatus is generally transferred while a program such as a control program and the like is stored in a ROM. However, the present invention is not limited to this; a control program which can be transferred independent from a computer may be written into a writable storage device provided in the computer according to the operation of a user. The commodity sales data processing apparatus may be transferred while the control program is recorded in a removable recording medium or is transferred through the communication via a network. The recording medium may be of any form as long as the recording medium can store a program like a CD-ROM, a memory card and the like and is apparatus-readable. Further, the functions achieved by an installed or downloaded program can also be realized through the cooperation with an OS (Operating System) in the apparatus.

However, the connection between the information terminal 11 and the docking station 12 is not limited to a contact-type connection with a connector. For example, the information terminal 11 may be powered through a non-contact charging with an electromagnetic induction in accordance with Qi standard, and the confirmation of the connection between the information terminal 11 and the docking station 12, and the communication therebetween may be realized through a proximity wireless communication such as Bluetooth and NFC (Near Field Communication).

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity sales data processing apparatus comprising:
a portable information terminal, carrying a battery as a driving power supply;
a docking station, with which the portable information terminal is detachably connected, configured to charge the battery of the portable information terminal in response to the portable information terminal being connected with the docking station;
the portable information terminal comprising:
an input section configured to receive the input of data relating to the sales processing of a commodity;
a memory configured to store an application program to execute jobs for processing the data relating to the sales processing of a commodity;
a processor configured to selectively execute jobs for processing the input of data relating to the sales processing of a commodity in accordance with the application program;
a display section configured to display job names executable by the processor and the processing result of the processor; and
a job control table configured to set information for specifying, for each job permitted in the connection state of the portable information terminal and the docking station, whether or not the job is permitted in the disconnection state of the portable information terminal and the docking station;
the processor executes:
a monitoring whether or not the portable information terminal is connected with the docking station as a function of detecting a disconnection state of the portable information terminal and the docking station;
restricting jobs permitted at the time the portable information terminal is disconnected with the docking station to a part of jobs permitted at the time the portable information terminal is connected with the docking station based on the job control table if the disconnection state between the portable information terminal and the docking station is detected, wherein the display displays job names permitted at the time the portable information terminal is disconnected with the docking station if the disconnection state is detected.

2. The commodity sales data processing apparatus according to claim 1, wherein
the processor detects the connection state between the portable information terminal and the docking station, a sign on is validated if the connection state is detected or a sign on is invalidated if the disconnection state is detected when a sign-on input as a data for specifying user through the input section is received.

3. The commodity sales data processing apparatus according to claim 2,
the memory configured to store an identification information for identifying the docking station to the portable information terminal if the sign on is validated,
the processor further executes:
determining whether the identification information of the docking station in connection state matches the identification information stored in the memory when the connection state between the portable information terminal and the docking station changes from a disconnection state to a connection state; and
reporting an error when the identification information of the docking station in connection state and the identification information stored in the memory do not match.

4. The commodity sales data processing apparatus according to claim 1, wherein the docking station further includes a connector for detachably connecting with the portable information terminal to charge the battery of the portable information terminal connected with the connector, and the processor monitors whether or not the portable information terminal is connected with the docking station via the connector.

5. The commodity sales data processing apparatus according to claim 1, wherein the portable information terminal is a tablet type terminal which integrates the input section and the display section as a touch panel.

6. A method for controlling job by a commodity sales data processing apparatus including a portable information terminal, carrying a battery as a driving power supply and a docking station, with which the portable information terminal is detachable connected, configured to charge the battery of the portable information terminal in response to the portable information terminal being connected with the docking station, wherein the portable information terminal comprising an input section configured to receive the input data relating to the sales processing of a commodity, a memory configured to store an application program to execute jobs for processing the data relating to the sales processing of a commodity;
and a processor configured to selectively execute jobs for processing the inputted data relating to the sales processing of a commodity based on the application program,
the portable information terminal further comprising:
a display section configured to display job names executable by the processor and the processing result of the processor;
a job control table configured to set information for specifying, for each job permitted in the connection state of the portable information terminal and the docking station, whether or not the job is permitted in the disconnection state of the portable information terminal and the docking station;
the processor executes:
monitoring whether or not the portable information terminal is connected with the docking station as a function of detecting a disconnection state of the portable information terminal and the docking station
restricting jobs permitted at the time the portable information terminal is disconnected with the docking station to a part of jobs permitted at the time the portable information terminal is connected with the docking station based on a data of the job control table if the disconnection state between the portable information terminal and the docking station is detected, wherein the display displays job names permitted at the time the portable information terminal is disconnected with the docking station if the disconnection state is detected.

7. The method according to claim 6, wherein the portable information terminal has a first connector and the docking station has a second connector, wherein the detecting the disconnection state is confirmed by monitoring the connection between the first connector and the second connector.

* * * * *